US011509880B2

(12) United States Patent
Martinez Bauza et al.

(10) Patent No.: US 11,509,880 B2
(45) Date of Patent: Nov. 22, 2022

(54) DYNAMIC ADJUSTMENT OF LIGHT SOURCE POWER IN STRUCTURED LIGHT ACTIVE DEPTH SENSING SYSTEMS

(71) Applicant: QUALCOMM Incorporated, San Diego, CA (US)

(72) Inventors: Judit Martinez Bauza, San Diego, CA (US); Kalin Mitkov Atanassov, San Diego, CA (US); Sergiu Radu Goma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1308 days.

(21) Appl. No.: 13/723,891

(22) Filed: Dec. 21, 2012

(65) Prior Publication Data
US 2014/0132722 A1    May 15, 2014

Related U.S. Application Data

(60) Provisional application No. 61/726,387, filed on Nov. 14, 2012.

(51) Int. Cl.
*H04N 13/207* (2018.01)
*G01B 11/25* (2006.01)
(Continued)

(52) U.S. Cl.
CPC .......... *H04N 13/207* (2018.05); *G01B 11/25* (2013.01); *G01B 11/2513* (2013.01); *G06T 5/50* (2013.01);
(Continued)

(58) Field of Classification Search
CPC ............. G01B 11/25; G01B 11/2513; H04N 13/0207; H04N 13/207; G06T 7/521; G06T 5/50; G06T 2207/20221
(Continued)

(56) References Cited

U.S. PATENT DOCUMENTS 5,467,413 A * 11/1995 Barrett .................... G06T 9/008
375/240.03
6,377,700 B1    4/2002 Mack et al.
(Continued)

FOREIGN PATENT DOCUMENTS

AU    2003212775 A1    10/2003
AU    2005228969 A1    10/2005
(Continued)

OTHER PUBLICATIONS

Gokturk, et al., "A Time-of-Flight Depth Sensor-System Description, Issues and Solutions", Proceedings of the 2004 IEEE Computer Society Conference on Computer Vision and Pattern Recognition Workshops (CVPRW'04), 2004, 9 pp.
(Continued)

*Primary Examiner* — Matthew K Kwan
(74) *Attorney, Agent, or Firm* — Qualcomm Incorporated

(57) ABSTRACT

A method and device is provided that compensates for different reflectivity/absorption coefficients of objects in a scene/object when performing active depth sensing using structured light. A receiver sensor captures an image of a scene onto which a code mask is projected. One or more parameters are ascertained from the captured image. Then a light source power for a projecting light source is dynamically adjusted according to the one or more parameters to improve decoding of the code mask in a subsequently captured image. Depth information for the scene may then be ascertained based on the captured image based on the code mask. In one example, the light source power is fixed at a particular illumination while an exposure time for the receiver sensor is adjusted. In another example, an exposure time for the receiver sensor is maintained/kept at a fixed value while the light source power is adjusted.

40 Claims, 10 Drawing Sheets

902 Binary codeword ($k_1 \times k_2$)

904   908
Shape modulated carrier

(51) Int. Cl.
*G06T 5/50* (2006.01)
*G06T 7/521* (2017.01)

(52) U.S. Cl.
CPC .... *G06T 7/521* (2017.01); *G06T 2207/20221* (2013.01)

(58) Field of Classification Search
USPC .......................................................... 348/46
See application file for complete search history.

(56) References Cited

U.S. PATENT DOCUMENTS

| | | | |
|---|---|---|---|
| 6,503,195 | B1 | 1/2003 | Keller et al. |
| 6,825,936 | B2 | 11/2004 | Metcalfe et al. |
| 6,909,799 | B1 | 6/2005 | Wildmann et al. |
| 7,182,465 | B2 | 2/2007 | Fuchs et al. |
| 7,227,117 | B1 | 6/2007 | Lackemann et al. |
| 7,957,639 | B2 | 6/2011 | Lee et al. |
| 8,149,326 | B2 | 4/2012 | Olsen et al. |
| 2003/0020827 | A1* | 1/2003 | Bean ...................... H04N 5/238 348/363 |
| 2004/0262393 | A1* | 12/2004 | Hara .................. G06K 7/10851 235/462.14 |
| 2005/0119527 | A1* | 6/2005 | Banik ................ A61B 1/00059 600/117 |
| 2005/0162644 | A1 | 7/2005 | Watanabe |
| 2005/0206874 | A1 | 9/2005 | Dougherty |
| 2006/0109482 | A1 | 5/2006 | Duval et al. |
| 2007/0031029 | A1 | 2/2007 | Sasaki |
| 2008/0130016 | A1 | 6/2008 | Steinbichler et al. |
| 2009/0022367 | A1 | 1/2009 | Sasaki |
| 2009/0212111 | A1 | 8/2009 | Krichi et al. |
| 2009/0322745 | A1* | 12/2009 | Zhang .................. G06T 7/0057 345/420 |
| 2010/0110180 | A1* | 5/2010 | Tonogai .................... G06T 5/50 348/136 |
| 2010/0149551 | A1 | 6/2010 | Malinkevich |
| 2011/0080471 | A1 | 4/2011 | Song et al. |
| 2011/0205552 | A1 | 8/2011 | Bendall et al. |
| 2012/0026510 | A1 | 2/2012 | Crampton et al. |
| 2012/0050557 | A1 | 3/2012 | Atanassov et al. |
| 2012/0056982 | A1 | 3/2012 | Katz et al. |
| 2012/0087573 | A1* | 4/2012 | Sharma .............. G06K 9/00771 382/154 |
| 2013/0222820 | A1 | 8/2013 | Nakaso |
| 2014/0132721 | A1 | 5/2014 | Martinez Bauza et al. |

FOREIGN PATENT DOCUMENTS

| | | |
|---|---|---|
| CN | 1350633 A | 5/2002 |
| CN | 1554926 A | 12/2004 |
| CN | 1768346 A | 5/2006 |
| CN | 101520319 A | 9/2009 |
| CN | 101627280 A | 1/2010 |
| CN | 101694376 A | 4/2010 |
| CN | 101865671 A | 10/2010 |
| CN | 101932904 A | 12/2010 |
| CN | 201748900 U | 2/2011 |
| CN | 102203550 A | 9/2011 |
| CN | 102221344 A | 10/2011 |
| CN | 102385237 A | 3/2012 |
| CN | 103109158 A | 5/2013 |
| DE | 10333493 A1 | 2/2005 |
| JP | H10508107 A | 8/1998 |
| JP | 2003121125 A | 4/2003 |
| JP | 2007271530 A | 10/2007 |
| JP | 2007315864 A | 12/2007 |
| JP | 2011028414 A | 2/2011 |
| KR | 20070054784 A | 5/2007 |
| WO | 2011048860 A1 | 4/2011 |
| WO | 2011145168 A1 | 11/2011 |
| WO | 2011145319 A1 | 11/2011 |
| WO | 2012124788 A1 | 9/2012 |

OTHER PUBLICATIONS

Partial International Search Report for International Application PCT/US2013/065386, ISA/EPO, dated Jan. 30, 2014, 6 pages.

International Search Report and Written Opinion—PCT/US2013/065386—ISA/EPO—dated Mar. 21, 2014, 15 Pages.

Ihnken S., et al., "Exposure Times in Rapid Light Curves Affect Photosynthetic Parameters in Algae", Aquatic Botany, Oct. 31, 2010, pp. 185-194.

Wu L., et al., "Methods of 3D Measurement on Specular Surface Based on Structured Light", Tool Technology, Mar. 25, 2011 (Mar. 25, 2011), 5 Pages.

Zhang Y., "Research on Optical 3D Measurement Methods Based on Modulation", Chinese Full-Text Database of Excellent Doctor and Master Degree Theses (Master), Engineering Technology, Album II, Oct. 10, 2006, 74 Pages.

* cited by examiner

DYNAMIC ADJUSTMENT OF LIGHT SOURCE POWER IN STRUCTURED LIGHT ACTIVE DEPTH SENSING SYSTEMS

CROSS REFERENCE TO RELATED APPLICATIONS

The present Application for Patent claims priority to U.S. Provisional Applications No. 61/726,387 filed Nov. 14, 2012, which is hereby expressly incorporated by reference.

BACKGROUND

Field

Various features pertain to active depth sensing and more specifically to techniques to compensate for different reflectivity/absorption coefficients of objects in a scene when performing active depth sensing system using structured light.

Background

In active sensing, a known pattern (e.g., code mask) is used to illuminate a scene or object in process often referred to as "structured light". The structure of the pattern projected on the scene or object encodes depth information for the scene or object. Once the pattern is found in a received image, the 3-dimensional scene or object may be reconstructed. The relationship between the known projected pattern and the decoded one can be used to derive depth information on the captured scene.

A receiver/camera sensor may capture an image of a scene from the incident light coming from a reflection of a light source onto the scene (e.g., person, object, location, etc.). The intensity of the incident light may depend on: (a) the reflectance properties of the surfaces in the scene, (b) the power of the light that generates the projected pattern, and/or (c) ambient light. If the incident light on the camera sensor is too strong, it saturates the sensor. If it is too weak, the camera sensor does not capture the variations in reflectivity of the scene. Even within a scene, depending on the type of surfaces being captured in an image, both situations (e.g., captured light too strong and too weak) can happen at the same time. If no adjustment to the strength of incident light is included in the system, it's impossible to capture the variations in illumination of the projected pattern (e.g., code mask) for a wide range of situations (different ambient lights, different pre-set power of the light source, different surface types).

Consequently, a solution is needed to compensate for variations in incident light intensity when performing depth sensing of a scene using a structured light system.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A device adapted to compensate for differences in surface reflectivity in an active depth sensing system using structured light is provided. The device may include a receiver sensor and a processing circuit. The receiver sensor may serve to capture an image of a scene onto which a code mask is projected. The processing circuit may be adapted to: (a) ascertain one or more parameters from the captured image; (b) dynamically adjust a light source power for a projecting light source according to the one or more parameters to improve decoding of the code mask in a subsequently captured image; and/or (c) ascertain depth information for the scene in the captured image based on the code mask.

In one exemplary implementations, the light source power is fixed at a particular illumination while an exposure time for the receiver sensor is adjusted. In another exemplary implementation, an exposure time for the receiver sensor is maintained at a fixed value while the light source power is adjusted.

The one or more parameters may be correlated to regions within the captured image based on the code mask.

In one example, the projecting light source may include a plurality of light elements, and dynamically adjusting the light source power for the projecting light source includes individually controlling the light source power for each of the light elements based on the corresponding one or more parameters. The receiver sensor may be further adapted to capture a new image of the scene onto which the code mask is projected, wherein the new image is light compensated on a region-by-region basis due to the operation of the individually adjusted plurality of light elements.

The receiver sensor may include a plurality of individually controlled sensor shutters, and the processing circuit may be further adapted to individually control the plurality sensor shutters based on the corresponding one or more parameters to adjust the light captured by the receiver sensor. The sensor shutters may be controlled to either reduce or increase the light that passes through them to compensate for too much or too little light in a given region as indicated by the one or more parameters.

The receiver sensor may be further adapted to capture a new image of the scene onto which the code mask is projected, wherein the new image is light compensated on a region-by-region basis due to the operation of the individually adjusted plurality of sensor shutters.

A method is also provided to compensate for differences in surface reflectivity in an active depth sensing system using structured light. For instance, a receiver sensor may capture an image of a scene onto which a code mask is projected. A processing circuit may then ascertain one or more parameters from the captured image. A light source power for a projecting light source may then be dynamically adjusted according to the one or more parameters to improve decoding of the code mask in a subsequently captured image. Depth information for the scene may be ascertained in the captured image based on the code mask.

BRIEF DESCRIPTION OF THE DRAWINGS

These and other sample aspects of the disclosure will be described in the detailed description that follow, and in the accompanying drawings.

DETAILED DESCRIPTION

Figure 1:
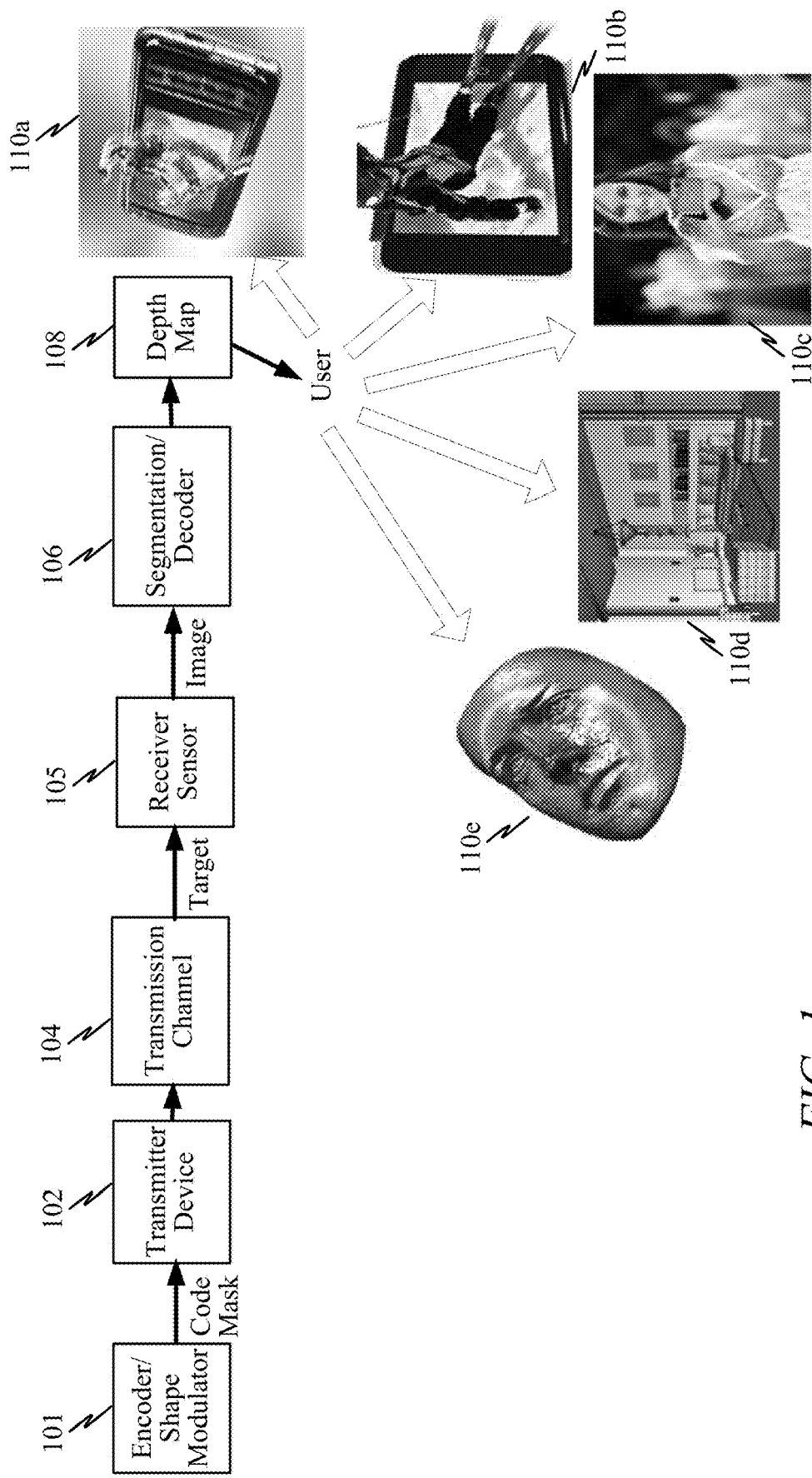
FIG. 1 illustrates a system for active sensing where a 3-dimensional (3D) scene is constructed from 2-dimensional (2D) images or information.

In the following description, specific details are given to provide a thorough understanding of the embodiments. However, it will be understood by one of ordinary skill in the art that the embodiments may be practiced without these specific detail. For example, circuits may be shown in block diagrams in order to avoid obscuring the embodiments in unnecessary detail. In other instances, well-known circuits, structures and techniques may not be shown in detail in order not to obscure the embodiments.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation.

Overview

Techniques are provided to compensate for different reflectivity/absorption coefficients of objects in a scene when performing active depth sensing using structured light. Various features are provided that dynamically adjust to, and compensate for, variations in the reflectivity/absorption of objects in a scene being captured.

A first feature provides a receiver sensor that captures an image of a scene onto which a code mask is projected. One or more parameters are ascertained from the captured image. Then a light source power for a projecting light source is dynamically adjusted according to the one or more parameters to improve decoding of the code mask in a subsequently captured image. Depth information for the scene may then be ascertained based on the captured image based on the code mask. In one example, the light source power is fixed at a particular illumination while an exposure time for the receiver sensor is adjusted. In another example, an exposure time for the receiver sensor is maintained/kept at a fixed value while the light source power is adjusted.

A second feature provides a receiver sensor that captures a plurality of images, at two or more (different) exposure times, of a scene onto which a code mask is projected. The two or more of the plurality of images are combined by extracting decodable portions of the code mask from each image to generate a combined image. Depth information for the scene may then be ascertained based on the combined image and using the code mask.

A third feature provides for using two receiver sensors at a different exposure time each to capture a scene or object. A first receiver sensor captures a first image, at a first exposure time, of a scene onto which a code mask is projected. A second receiver sensor captures a second image, at a second exposure time, of the scene onto which the code mask is projected. The first and second images are then combined by extracting decodable portions of the code mask from each image to generate a combined image. Depth information for the scene may then be ascertained based on the combined image and using the code mask.

Active Depth Sensing

FIG. 1 illustrates a system for active sensing where a 3-dimensional (3D) scene is constructed from 2-dimensional (2D) images or information. One or more features for compensating for different reflectivity/absorption coefficients of objects in a scene when performing active depth sensing system using structured light. An encoder/shape modulator 100 may serve to generate a code mask which is then projected by a transmitter device 102 over a transmission channel 104. The code mask may be projected onto a target (e.g., a scene or object) and the reflected light is captured by a receiver sensor 105 as an image (e.g., code mask image). This received image may be decoded 106 and used to present, generate, and/or provide a 3-dimensional version 110$a$-$e$ of the target. Active sensing relies on being able to recognize all spatial codes (i.e., codewords) from the code mask being projected on the target. Various features and aspects described herein may be implemented as part of the system and device(s) illustrated herein.

Figure 2:
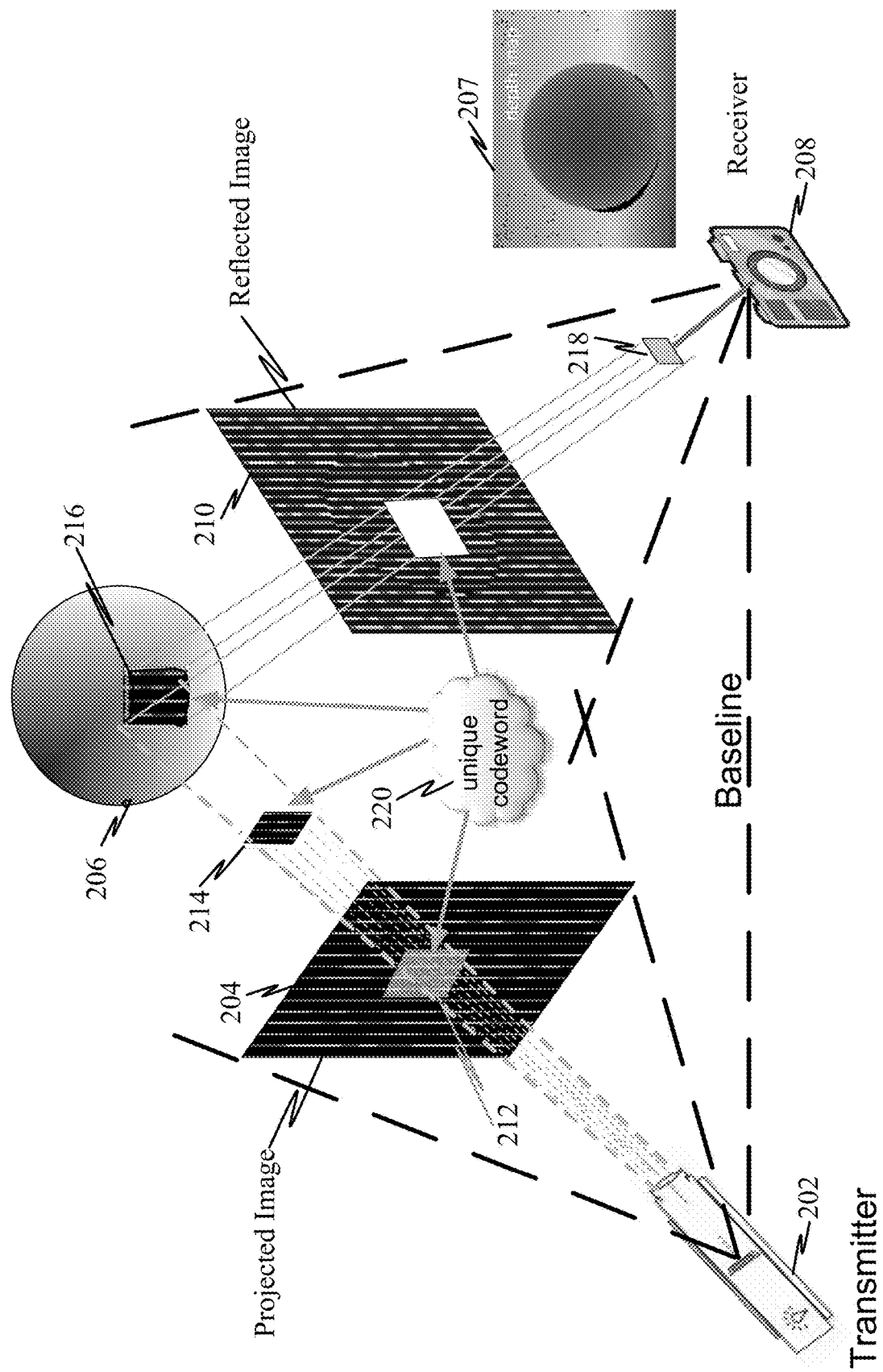
FIG. 2 illustrates active sensing where a known pattern is used to illuminate a scene or object and obtain depth information with which to generate 3-dimensional information from 2-dimensional images and/or information.

FIG. 2 illustrates active sensing where a known pattern is used to illuminate a scene or object and obtain depth information with which to generate 3-dimensional information from 2-dimensional images and/or information. Here, a transmitter 202 projects a light field through a code mask 204 (e.g., image with codes) to project codewords on an object or scene 206. A receiver 208 (e.g., camera sensor) captures the projected code mask 210 and codewords therein. This example illustrates how a section/portion/window 212 of the code mask 204 is projected (as section/portion/window 214) onto the surface (e.g., projected section/portion/window 216) of the object or scene 206. The projected section/portion/window 216 may then be captured by the receiver 108 as a captured segment 218. The section/portion/window 212 may be used as a codeword that can be uniquely identified. Thus, by covering the scene or object 206 with unique codewords in this manner, sections/portions of the scene or object 206 may be identified/tagged and this information may be used for depth sensing.

From the image captured by the receiver 208 (camera sensor), multiple segments may be identified over the scene or object 206. Each segment 218 may be uniquely identifiable at the receiver 108 and its location relative to other segments ascertained from the known pattern of the coded mask 204. The identification of a code from each segment/portion/window may involve pattern segmentation (e.g., to address distortion) and decoding of the perceived segment/portion/window into a corresponding code(s). Additionally, triangulation may be applied over each captured segment/portion/window to ascertain an orientation and/or depth. Multiple such segments/portions/windows may be combined to stitch together a captured image pattern. In this manner, a depth map 207 may be generated for the scene, target, or object 206.

Figure 3:
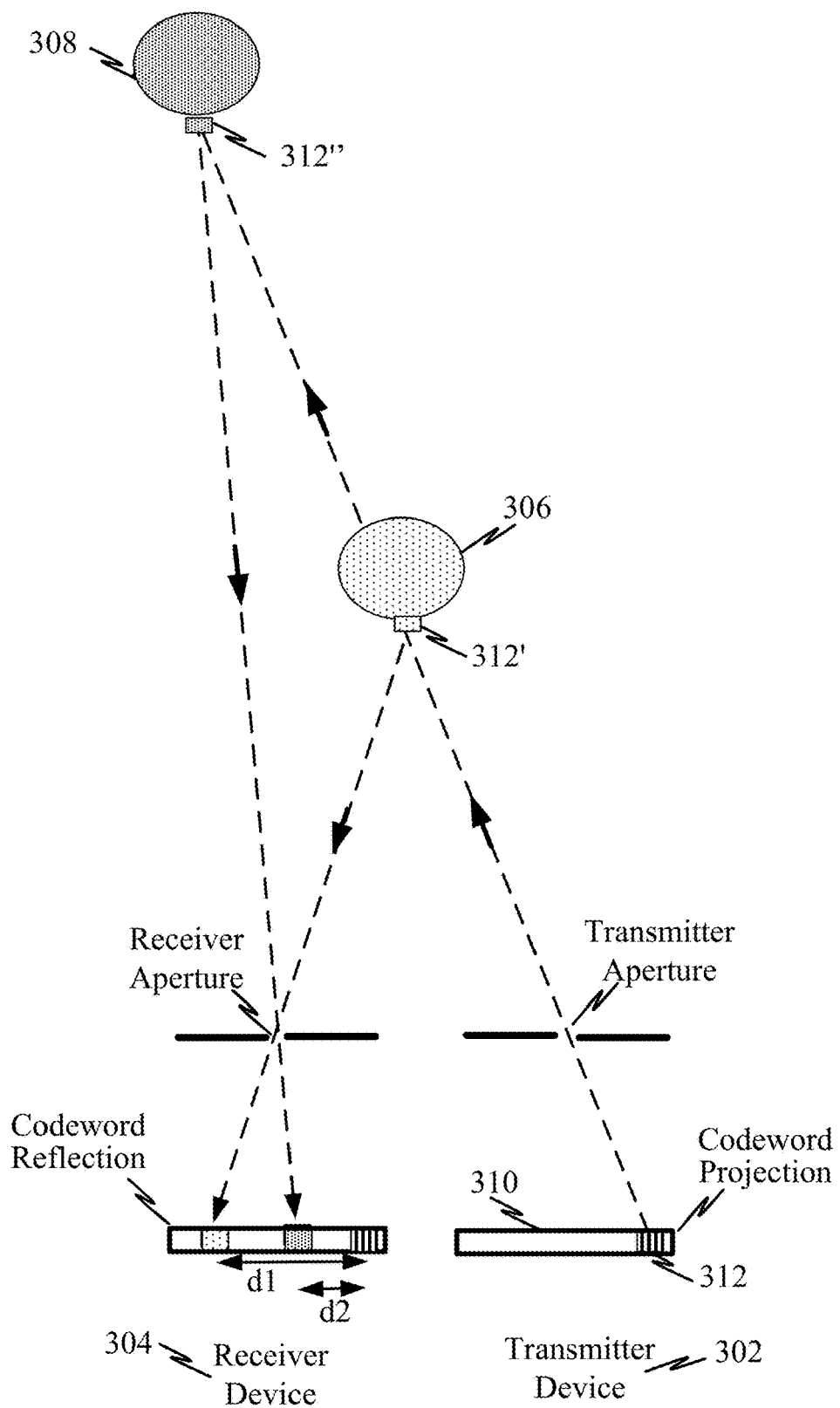
FIG. 3 illustrates how depth may be sensed for an object or scene.

FIG. 3 illustrates how depth may be sensed for an object or scene. Here, a transmitter 302 is on the same baseline reference plane as the receiver 304. The transmitter projects a code mask 310 onto a scene or object through an aperture or lens. Here, for purposes of illustration, a projected segment/portion/window 312 (representing a codeword) is shown as part of the transmitted code mask 310. This code segment/portion/window 312 may be projected on a scene or object 306 at a first distance or at a second distance. The receiver 304 captures the projected code mask 310 through a receiver aperture. It can be appreciated that when the scene or object 306 is located closer (e.g., a first distance from the transmitter) the projected segment 312 appears at a distance d1 from its initial location. Meanwhile, when the scene or object 308 is located further away (e.g., a second distance from the transmitter), the projected segment/portion/window 312 appears at a distance d2 from its initial location (where d2<d1). That is, the further away an object is from the transmitter/receiver (e.g., transmitter 302 to scene or object 308), the closer the received projected segment/portion/window is from its original position at the receiver (e.g., the outgoing projection and incoming projection are more parallel). Conversely, the closer an object is from the transmitter/receiver (e.g., transmitter 302 to scene or object 306), the further the received projected segment/portion/window is from its original position at the receiver. Thus, the difference between received and transmitted codeword position gives the depth of the scene or object. In one example, such depth (e.g., relative depth) may provide a depth for each pixel or subset of grouped pixels (e.g., regions of two or more pixels).

Various types of modulation and coding schemes have been conceived to generate a code mask. These modulation and coding schemes include temporal coding, spatial coding, and direct codification.

Figure 4:
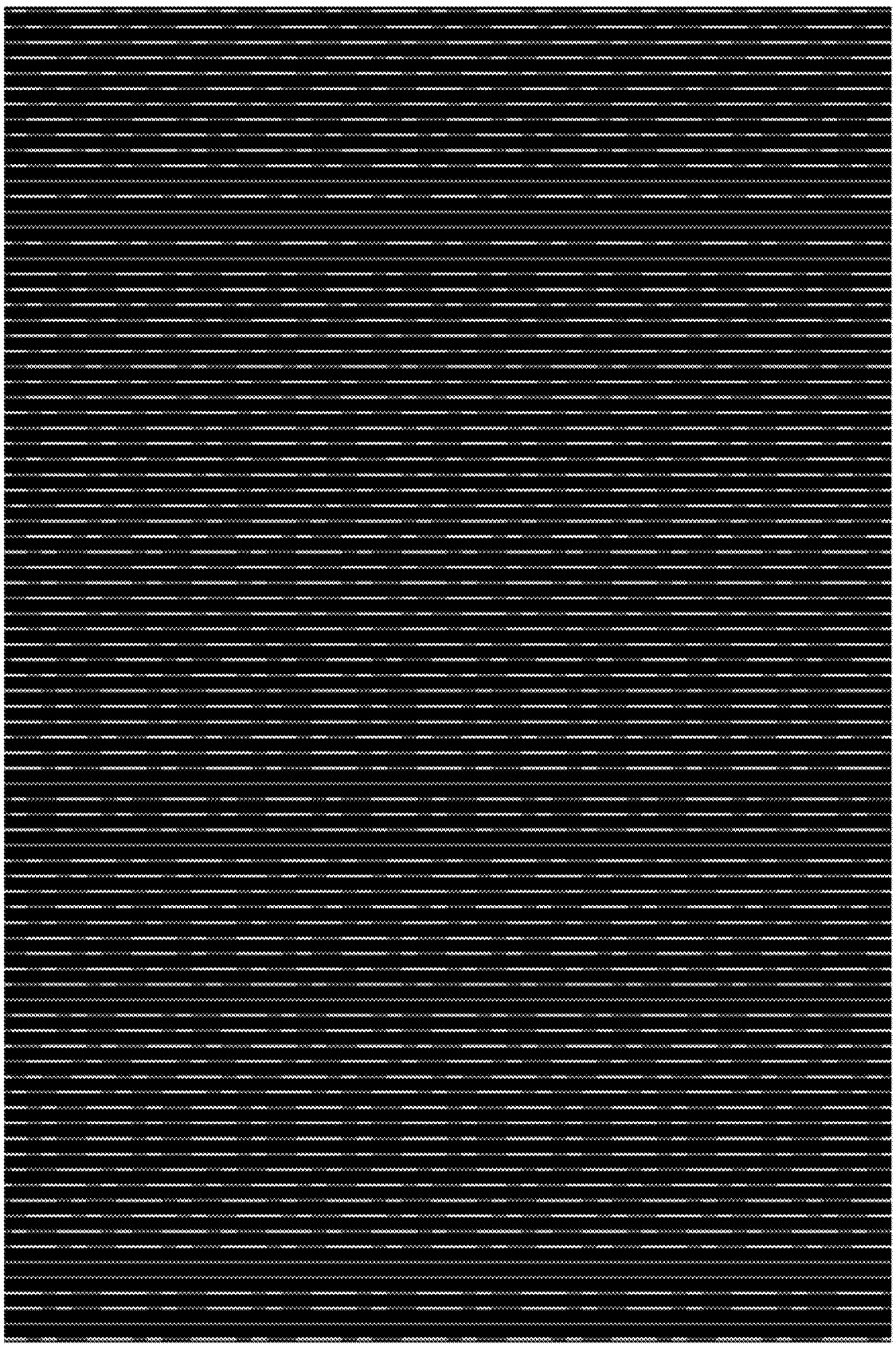
FIG. 4 illustrates an exemplary code mask 400 that uses three gray-scale levels (e.g., black, white, and a gray).

FIG. 4 illustrates an exemplary code mask 400 that uses three gray-scale levels (e.g., black, white, and a gray). In this example, black is used for a guard interval and white/gray are used for the code/reference stripes.

The image obtained with a receiver sensor 208 (e.g., camera) is formed by incident light coming from the reflection of the light source onto the scene. The intensity of the incident light may depend on: (a) the reflectance properties of the surfaces in the scene, (b) the power of the light that generates the projected pattern, and/or (c) ambient light. If the incident light on the camera sensor is too strong, it saturates the sensor. If it is too weak, the receiver 208 (e.g., camera sensor) does not capture the variations in reflectivity of the scene. Even within a scene, depending on the type of surfaces being captured in an image, both situations (e.g., captured light too strong and too weak) can happen at the same time. If no adjustment to the strength of incident light is included in the system, it is difficult to capture the variations in illumination of the projected pattern (e.g., code mask) for a wide range of situations (different ambient lights, different pre-set power of the light source, different surface types).

Various solutions are provided in which received light energy may be adjusted based on (a) camera sensor exposure time, and/or (b) projected light source power. One or more parameters are measured (e.g., pixel saturation, undecodable pixels, pixel illumination mean, variance, and/or entropy, etc.) from the one or more captured images obtained at a preset or a range of exposure times (e.g., shutter times) and/or projected light source powers (e.g., illumination strength). The exposure time and/or projected light source power is then adjusted based on the one or more parameters capture to capture an additional image for the scene.

First Exemplary Solution—Received Light Energy Adjustment

According to a first exemplary solution, the light energy received by a receiver/camera sensor is controlled according to certain parameters measured from an acquired image.

Figure 5:
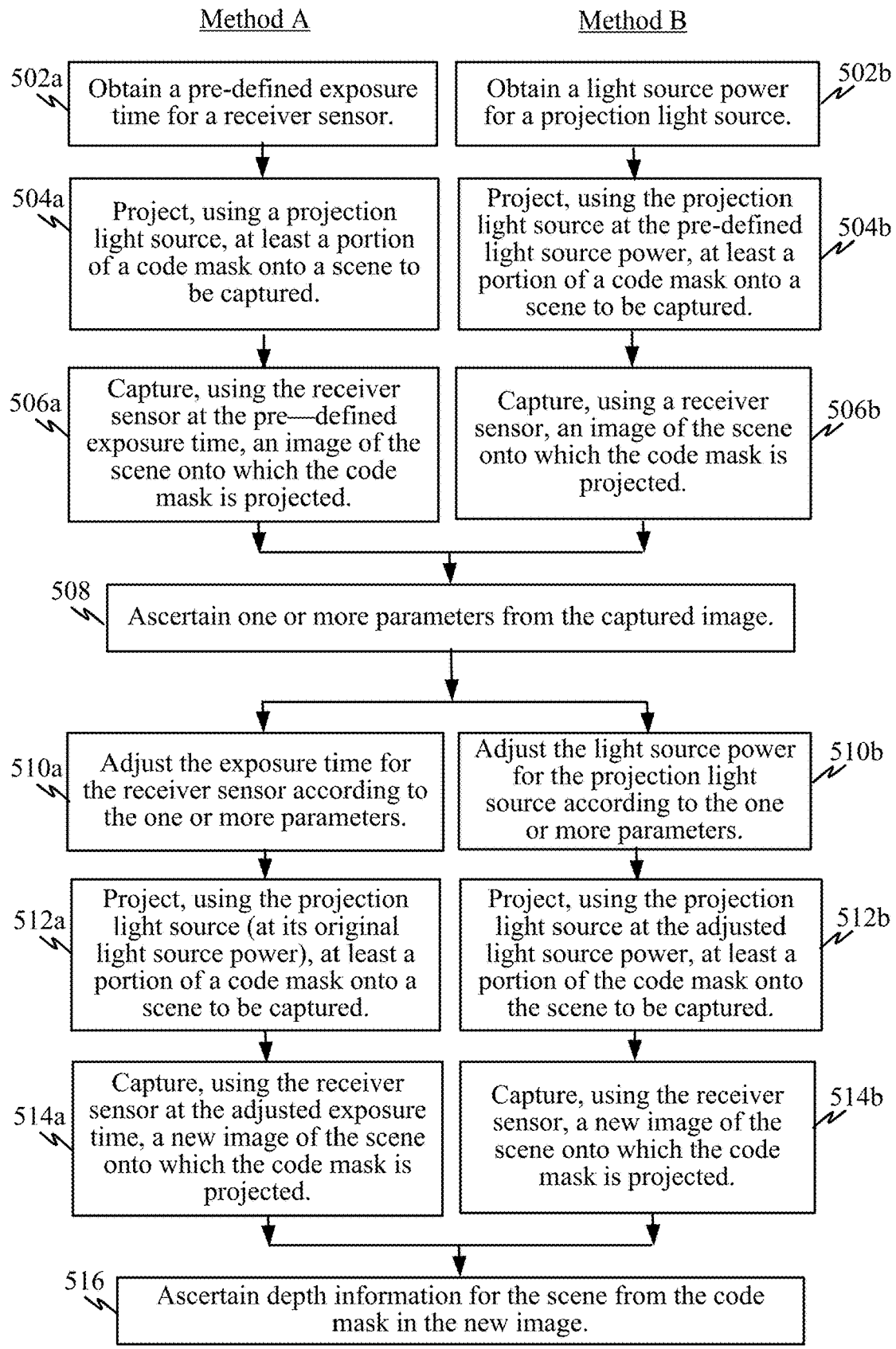
FIG. 5 illustrates at least two methods for adjusting light energy received by a receiver sensor in an active depth sensing system using structured light.

FIG. 5 illustrates at least two methods for adjusting light energy received by a receiver sensor in an active depth sensing system using structured light. These methods may be implemented, for example, in one or more components of the active sensing systems of FIGS. 2 and/or 8.

According to a first method (Method A), the exposure time of a receiver sensor (camera) is adjusted to compensate for over-exposure and/or under-exposure in an image used for active depth sensing. In this approach, exposure time for the receiver sensor is adjusted while the light source power is kept fixed.

A pre-defined exposure time is obtained for the receiver sensor 502a. A projection light source then projects at least a portion of a code mask onto a scene (e.g., target) to be captured 504a. The receiver sensor, at the pre-defined exposure time, then captures an image of the scene onto which the code mask is projected 506a.

One or more parameters may then be ascertained from the captured image 508. For instance, the parameters may include: (a) information related statistics, i.e., pixel illumination mean, variance, entropy, (b) a number of saturated pixels at the receiver sensor, and/or (c) a number of pixels where the projected code mask was unable to be decoded.

The exposure time for the sensor receiver may then be increased or decreased according to the one or more parameters 510a. That is, if the one or more parameters indicate over-saturation of the receiver sensor pixels, then the light source power is decreased. Otherwise, if the one or more parameters indicate under-exposure of the receiver sensor pixels, then the light source power is increased.

The projection light source again or continues to project (e.g., at its original light source power) at least a portion of the code mask onto the scene to be captured 512a. The receiver sensor now captures, at the adjusted exposure time, a new image of the scene onto which the code mask is projected 514a. Depth information for the scene may then be ascertained from the code mask in the new image 516.

According to a second method (Method B), the light source power for a projector (of the code mask) is adjusted to compensate for under-lighting and/or over-lighting in an image used for active depth sensing. In this approach, exposure time for the receiver sensor is kept fixed while the light source power is adjusted.

A pre-defined light source power is obtained for a light source 502b. The projection light source then projects at least a portion of a code mask onto a scene to be captured 504b. A receiver sensor then captures an image of the scene onto which the code mask is projected 506b.

One or more parameters may then be ascertained from the captured image 508. For instance, the parameters may include: (a) information related statistics, i.e., mean, variance, entropy, (b) a number of saturated pixels at the receiver sensor, and/or (c) a number of pixels where the projected code mask was unable to be decoded.

The light source power may then be adjusted (e.g., increased or decreased) according to the one or more parameters 510b. That is, if the one or more parameters indicate over-saturation of the receiver sensor pixels, then the light source power is decreased. Otherwise, if the one or more parameters indicate under-exposure of the receiver sensor pixels, then the light source power is increased.

The projection light source may project at least a portion of the code mask onto the scene to be captured 512b. The receiver sensor then captures a new image of the scene onto which the code mask is projected 514*b*. Depth information for the scene may then be ascertained from the code mask in the new image 516.

According to various implementations, the receiver sensor exposure time and/or the light source power may be adjusted, alone or in combination. For instance, if the number of saturated pixels of the receiver sensor is above a certain threshold, the exposure time of the receiver sensor is decreased or the power of the light source is decreased. In another example, if the number of black codes measured in the code mask in the captured image is above a certain threshold, the exposure time of the receiver sensor is increased and/or the power of the light source is increased.

According to an alternative approach, the one or more parameters may be obtained over more than one image (e.g., acquired at the same time by multiple receiver sensors or acquired at several instances by the same receiver sensor). In one example, different exposure times may be used on a plurality of different receiver sensors (e.g., cameras).

According to another alternative approach, 'saturated regions' or 'black regions' may be tracked across captured images and only use these regions for the measurement of the one or more parameters. This variation may provide some computational advantages in that it reduces the regions from which parameters are obtained.

In some implementations, a receiver device may be coupled to the receiver sensor and a projecting light source to perform the method(s) illustrated in FIG. 5. In such implementations, the receiver device may ascertain the one or more parameters from the captured image. Then, it may cause the light source power for the projecting light source to be dynamically adjusted to improve decoding of the code mask in a subsequently captured image.

Second Exemplary Solution—Receiver Dynamic Range Adjustment

According to a second exemplary solution, the light energy received by a receiver/camera sensor is controlled based on certain parameters measured from an acquired image at different exposure times and combined.

Figure 6:
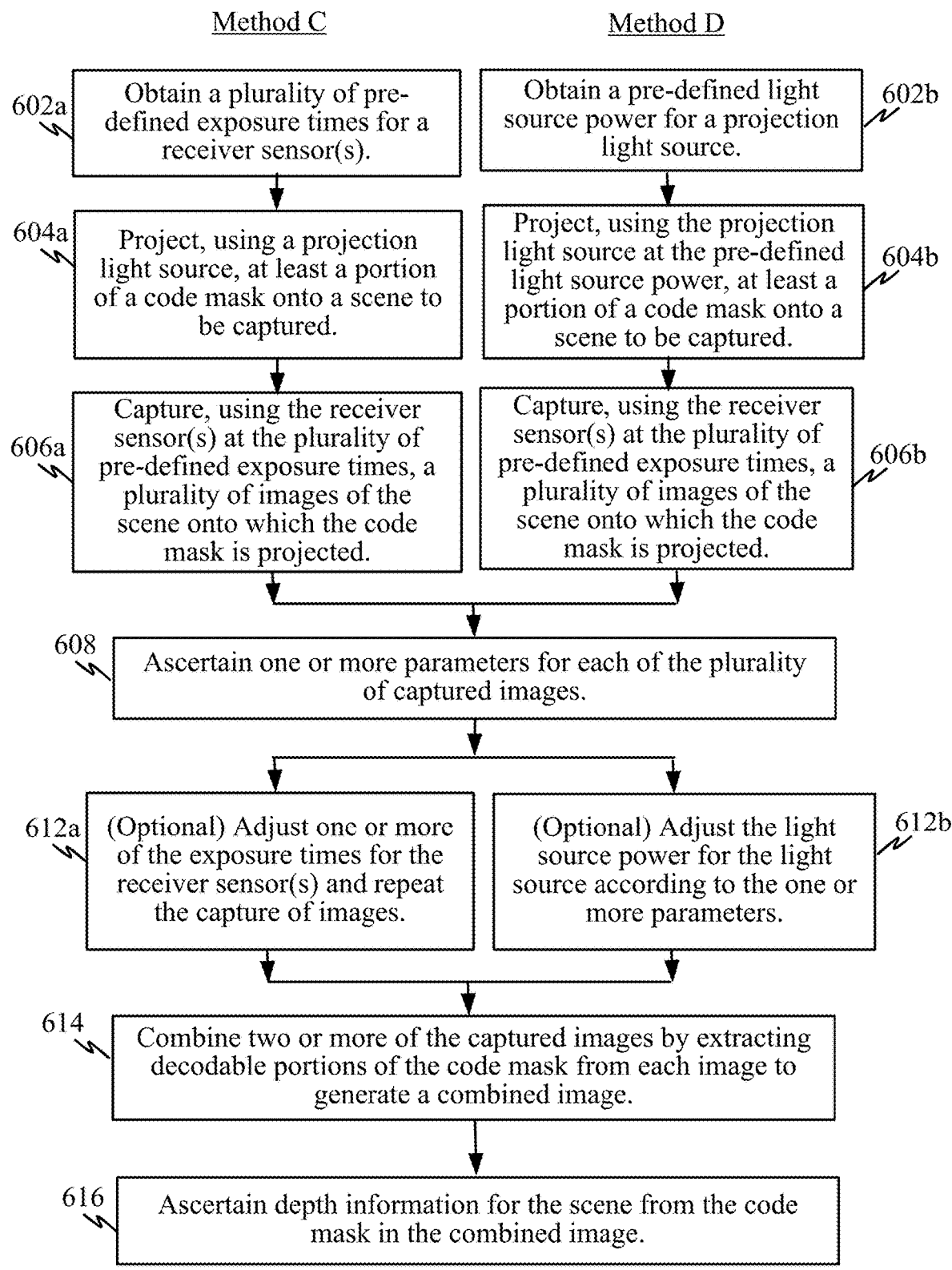
FIG. 6 illustrates at least two methods for adjusting light energy received by a receiver sensor in an active depth sensing system using structured light.

FIG. 6 illustrates at least two methods for adjusting light energy received by a receiver sensor in an active depth sensing system using structured light. These methods may be implemented, for example, in one or more components of the active sensing systems of FIGS. 2 and/or 8. These methods are similar to those illustrated in FIG. 5 but a plurality of images is initially captured at different exposure times and/or source light powers. Portions from two or more of the plurality of images may be combined according to a high dynamic range (HDR) algorithm. The combined image may extract the portions of two or more of the plurality of images from which codewords in the projected code mask can be perceived (e.g., from which patterns in the code mask can be recognized).

According to a third method (Method C), the exposure times of one or more receiver sensor(s) (camera) is adjusted to compensate for over-exposure and/or under-exposure in an image used for active depth sensing. In this approach, exposure times for the receiver sensor(s) is adjusted while the light source power is kept fixed.

A plurality of pre-defined exposure times is obtained for the receiver sensor(s) 602*a*. A projection light source then projects at least a portion of a code mask onto a scene to be captured 604*a*. The receiver sensor, at the pre-defined exposure time, then captures a plurality of images (e.g., one for each pre-defined exposure time) of the scene onto which the code mask is projected 606*a*.

One or more parameters may then be ascertained for each of the captured images 608. For instance, the parameters may include: (a) information related statistics, i.e., mean, variance, entropy, (b) a number of saturated pixels at the receiver sensor, and/or (c) a number of pixels where the projected code mask was unable to be decoded.

The receiver sensor settings for the acquisition of the set of images involved in the High Dynamic Range (HDR) algorithm may be dynamically changed based on the one or more parameters. For instance, the exposure times of one or more of the receive sensor(s) used for each image acquisition may, optionally, be adjusted according to the measured parameters 612*a*. Two or more of the captured images may then be combined (e.g., according to an HDR algorithm) by extracting decodable portions of the code mask from each image 614. Depth information for the scene may be ascertained from the code mask in the combined image 616.

In a scene that includes object surfaces of different reflectivity/absorption coefficients, the combination of images taken at different exposure times may serve to properly capture these objects, but at different exposure times for the receiver sensor. For instance, a first image taken with a first exposure time may properly capture the code mask projected on some objects of a scene but fail to properly capture the code mask projected on other objects of the same scene. A second image taken by the receiver sensor (or a different receiver sensor) at a second exposure time may properly capture the code mask projected on the other objects of the same scene. Therefore, by combining portions of two or more images taken at different exposures times, a combined image made up of the decodable portions of the code mask taken from the two or more images may be obtained.

According to a fourth method (Method D), the light source power control of one or more receiver sensor(s) (camera) is adjusted to compensate for over-exposure and/or under-exposure in an image used for active depth sensing. This approach is largely the same as Method C, but in step 612*b* the light source power is adjusted (instead of the exposure times) according to the one or more parameters.

Third Exemplary Solution—Selective Light Source Power Adjustment

According to a third exemplary solution, the light source power is locally/selectively controlled across different regions to adapt to varying reflectivity/absorption coefficients of the surfaces in the scene. That is, the light source may include a plurality of light elements that can be independently controlled so that different regions of the scene may be illuminated differently depending on the reflectivity/absorption of surfaces in the scene. Consequently, the light intensity in each region of the scene may be adjusted according to the reflectivity/absorption coefficients of the surfaces of objects in each such region of the scene.

Figure 7:
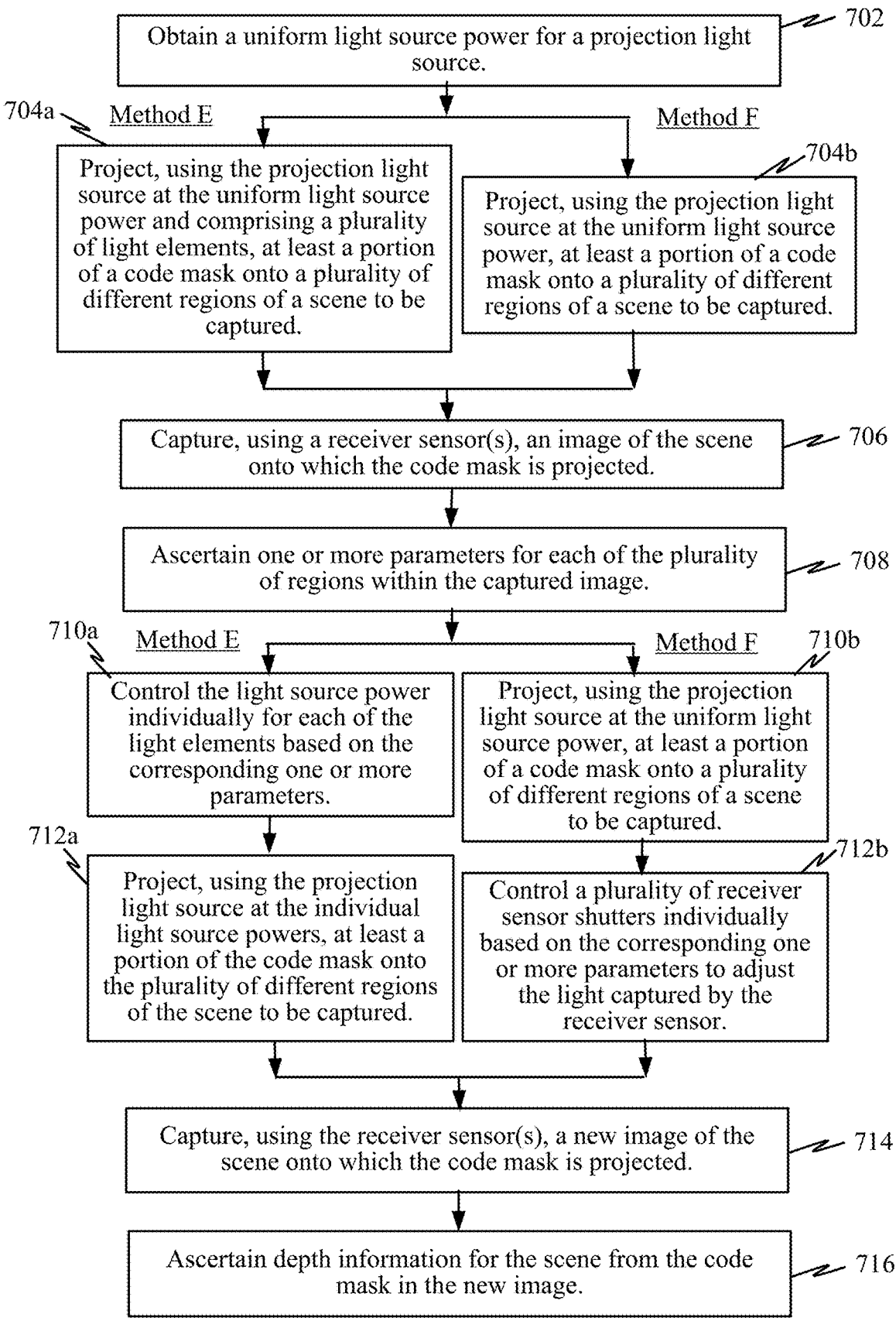
FIG. 7 illustrates another method for adjusting light energy received by a receiver sensor in an active depth sensing system using structured light.

FIG. 7 illustrates another method for adjusting light energy received by a receiver sensor in an active depth sensing system using structured light. This method may be implemented, for example, in one or more components of the active sensing systems of FIGS. 2 and/or 8. A first example (Method E) assumes that the projection light source is made up of a plurality of light elements (e.g., light emitting diodes arranged in a matrix configuration, etc.) whose intensity can be individually controlled. A second example (Method F) assumes that a plurality of receiver sensor shutters can be individually controlled to adjust the amount of light that each corresponding receiver sensor receives.

A uniform (pre-defined) light source power for the projection light source is obtained 702. According the first exemplary method (Method E), the projection light source comprises a plurality of light elements and projects at least a portion of a code mask, using the uniform light source power, onto a scene to be captured 704a. According to the second method (Method F), the projection light source projects at least a portion of a code mask, using the uniform light source power, onto a scene to be captured 704b. A receiver sensor then captures an image of the scene onto which the code mask is projected 706.

One or more parameters may then be ascertained for each of the plurality of regions within the captured image 708. Such regions may correspond to an area covered by a single light element or a sub-set of light elements. Such light elements may provide highly parallelized light beams, for example, such that there is minimal cross-over between light elements. The parameters obtained may include: (a) information related statistics, i.e., mean, variance, entropy, (b) a number of saturated pixels at the receiver sensor, and/or (c) a number of pixels where the projected code mask was unable to be decoded.

According to the first example (Method E), each element of the light source power may then be individually adjusted/controlled (e.g., increased or decreased) based on the corresponding one or more parameters 710a. That is, if the one or more parameters indicate over-saturation of the receiver sensor pixels corresponding to a first region, then the light source power for the corresponding light element is decreased. Likewise, if the one or more parameters indicate under-exposure of the receiver sensor pixels for a second region, the light source power for the corresponding light element is increased. After individually adjusting/controlling each light element power, the code mask may again be projected by the projection light source 712a.

According to the alternative second example (Method F), at least a portion of the code mask may be projected onto a plurality of different regions of the scene to be captured using the projection light source at the uniform light source power 710b. A plurality of receiver sensor shutters may be individually controlled based on the corresponding one or more parameters to adjust the light captured by the receiver sensor 712b. This may allow varying the amount of light captured by the receiver sensor(s) for each of the plurality of regions.

The receiver sensor may then capture a new image of the scene onto which the code mask is projected 714. Depth information may then be ascertained for the scene from the code mask in the new image 716.

These approaches adjust to variations in the strength of the incident light for the case where very different reflectance materials are part of the same scene. In Method E, since the intensity/power of each light element of the projection light source is individually controlled, individual regions of a scene can be illuminated at different light intensities concurrently. This provides better granularity in the adjustment of projected light (and power consumption) to the particular requirements of the scene. HDR may be achieved without the need to combine several images; consequently, higher frame rates are possible. Similarly, rather than adjusting the projected light power/intensity, in Method F the amount of light received by the receiver sensor(s) may be adjusted by individually controlling a plurality of receiver shutters. This allows to reducing the amount of light received in some regions and/or increasing the amount of light received in other regions.

Exemplary Depth Sensing System

Figure 8:
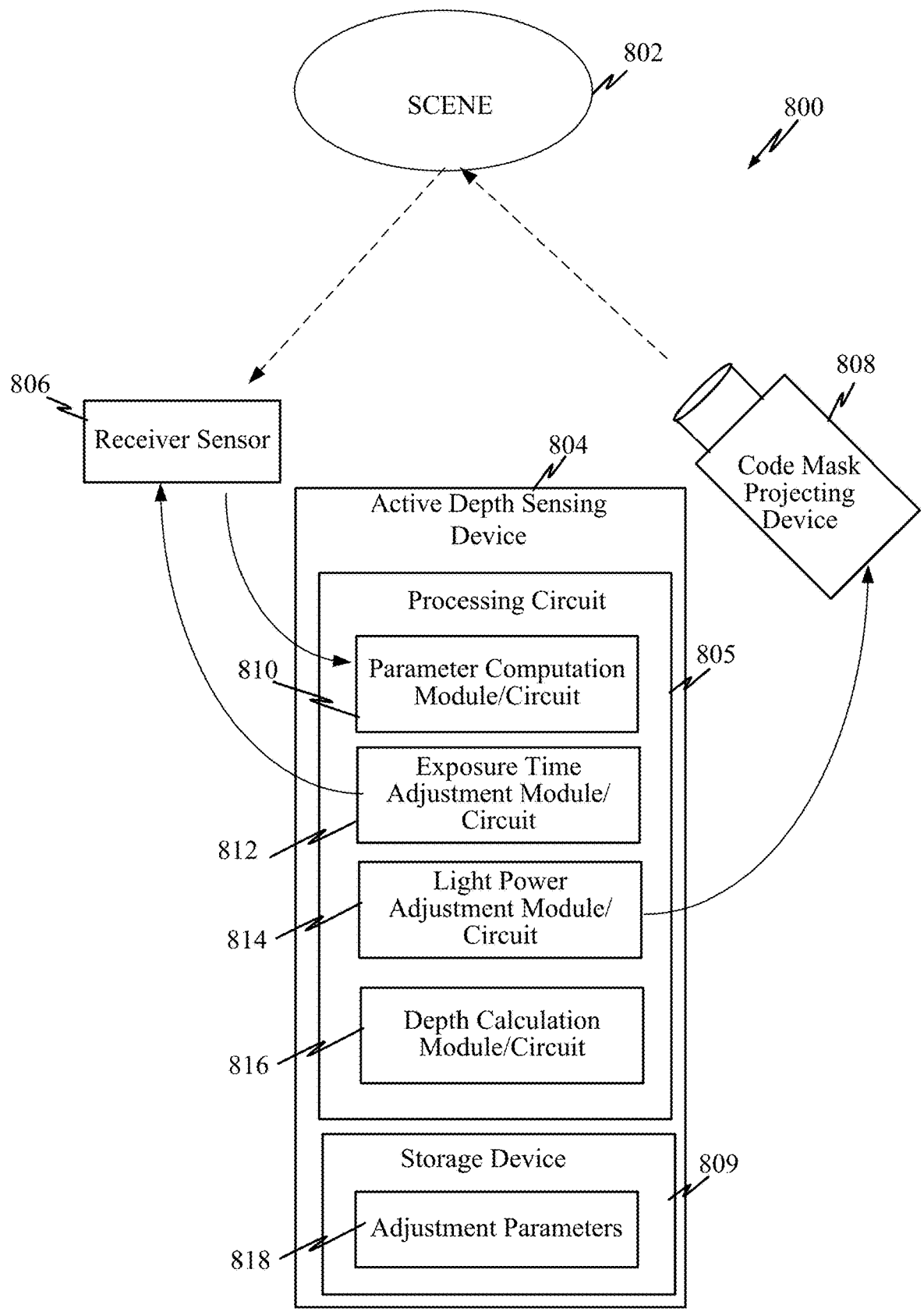
FIG. 8 illustrates an exemplary depth sensing system using structured light that dynamically adjusts for different reflectivity/absorption coefficients of the surfaces of objects in a scene being captured.

FIG. 8 illustrates an exemplary depth sensing system 800 using structured light that dynamically adjusts for different reflectivity/absorption coefficients of the surfaces of objects in a scene being captured. A code mask projecting device 808 may serve to project a code mask (e.g., using a light source) onto a scene 802 of interest. A receiver sensor 806 (e.g., camera) captures incident light coming from the reflection of the light source onto the scene 802 to obtain an image that includes at least a portion of the code mask as reflected by the scene 802. An active depth sensing device 804 may be coupled to the light projecting device (light source) 808 and/or the receiver sensor 806 and may be configured to dynamically adjust the exposure time for the receiver sensor 806 and/or the light source power for the projecting device 808. The active depth sensing device 804 may include a processing circuit 805 and/or a storage device 809. The processing circuit 805 may include or implement a parameter computation module/circuit 810, an exposure time adjustment module/circuit 812, a light power adjustment module/circuit 814, and/or a depth calculation module/circuit 816. These modules/circuits may be adapted to perform one or more functions describe and/or illustrated in FIGS. 5, 6, and/or 7. The storage device 809 may serve to, for example, store one or more adjustment parameters for the receiver sensor 806 and/or code mask projecting device 808.

The parameter computation module/circuit 810 may include an input interface through which it may receive one or more captured images (e.g., images of a scene or object with a code mask projected thereon) from the receiver sensor 806. The parameter computation module/circuit 810 may also include one or more image processing circuits that ascertain absolute or relative pixel saturation, undecodable pixels, pixel illumination mean, variance, and/or entropy, etc., for each of the one or more captured images received. These one or more parameters may be computed for the whole image and/or for regions (e.g., sectors, pixels) of each image. These one or more parameters may serve as inputs to the exposure time adjustment module/circuit 812 and/or the light power adjustment module/circuit 814.

The exposure time adjustment module/circuit 812 may use the one or more parameters to ascertain whether an exposure time for the receiver sensor 806 should be adjusted and how it should be adjusted. For example, if the one or more parameters indicate that a percentage of pixels greater than a threshold percentage are over-saturated (i.e., too much illumination), then the exposure time adjustment module/circuit 812 reduces the shutter time for the receiver sensor 806. Conversely, if the one or more parameters indicate that a percentage of pixels greater than a threshold percentage are under-exposed (i.e., too little illumination), then the exposure time adjustment module/circuit 812 increases the shutter time for the receiver sensor 806. Similarly, other thresholds for undecodable pixels, pixel illumination mean, variance, and/or entropy, etc., may be used to ascertain if and/or how the receiver sensor should be adjusted. The exposure time adjustment module/circuit 812 may include an output interface that permits it to communicate such adjustments to the receiver sensor 806.

The light power adjustment module/circuit 814 may use the one or more parameters to ascertain whether an illumination power for the code mask projecting device 808 should be adjusted and how it should be adjusted. For example, if the one or more parameters indicate that a percentage of pixels greater than a threshold percentage are over-saturated (i.e., too much illumination), then light power adjustment module/circuit 814 reduces the light source (illumination) power for the projecting device 808. Conversely, if the one or more parameters indicate that a percentage of pixels greater than a threshold percentage are under-exposed (i.e., too little illumination), then the light power adjustment module/circuit 814 increases the light source (illumination) power for the projecting device 808. Similarly, other thresholds for undecodable pixels, pixel illumination mean, variance, and/or entropy, etc., may be used to ascertain if and/or how the receiver sensor should be adjusted. The light power adjustment module/circuit 814 may include an output interface that permits it to communicate such adjustments to the receiver sensor 806.

The depth calculation module/circuit 816 may use a code mask that is projected on a scene or object in one or more captured images (e.g., images of a scene or object with a code mask projected thereon) from the receiver sensor 806 to ascertain a depth. The depth calculation module/circuit 816 may perform one or more computations, as illustrated in FIGS. 2 and 3 for example, to ascertain a depth for different regions or groups of pixels of an image. This depth information for the image may then be stored along with the image.

According to another alternate feature, a first receiver device may be used to control the light power and a separate second receiver device may be used to capture the image from which a depth map is obtained. For example, the first receiver device may be a lower resolution sensor (relative to the second receiver device) that runs at an increased/higher frame rate.

In some implementations, the code mask projecting device 808 may project the code mask in a light spectrum not visible by humans (e.g., infrared). For example, a first receiver may be used to capture the code mask projected on a scene or object while a second receiver may be used to capture an image of the scene or object without the code mask.

In some implementations, the depth sensing system 800 may be considered a feedback system, where upon projection of the code mask, the reflection of the code mask (or portion thereof) is captured as an image by the receiver sensor 806 which may adjust the projecting light source power for the projecting device 808 Thus, an initial projection of the code mask may serve as feedback to adjust the depth sensing system 800 so that codewords in the projected and reflected code mask can be correctly ascertained. If the initial captured image by the receiver sensor 806 has parameters that indicate saturation (e.g., light power too strong for receiver sensor), then the light power adjustment module/circuit 814 may reduce the projecting light source power of the projecting device 808. Similarly, if the initial captured image by the receiver sensor 806 has parameters that indicate under exposure (e.g., light power too weak for receiver sensor), then the light power adjustment module/circuit 814 may increase the projecting light source power of the projecting device 808. This process may be repeated multiple times until an acceptable projecting light power is achieved that results in the parameters for a captured image to be within a range or threshold. In one example, the feedback process may be iterative, using incremental steps (e.g., fixed or variable adjustment steps) to increase/decrease the projecting light power of the projecting device 808. In another example, the parameters obtained for an initial (previous) captured image may serve to compute or estimate a particular power adjustment which is then used to adjust the projecting device 808.

In alternative implementations, this feedback system may serve to adjust an exposure time for the receiver sensor 806. That is, rather than adjusting the projecting light power, the receiver sensor 806 may adjust its own shutter exposure time, by increasing shutter time if an under exposure is ascertained from an initial captured image or decreasing a shutter time if an over exposure (saturation) is ascertained from an initial captured image. This may be an iterative process in which shutter exposure time may be incrementally adjusted by a fixed/variable step size, or based on an estimate ascertained from the parameters of a captured image.

Ascertaining Parameters for Captured Image(s)

Figure 9:
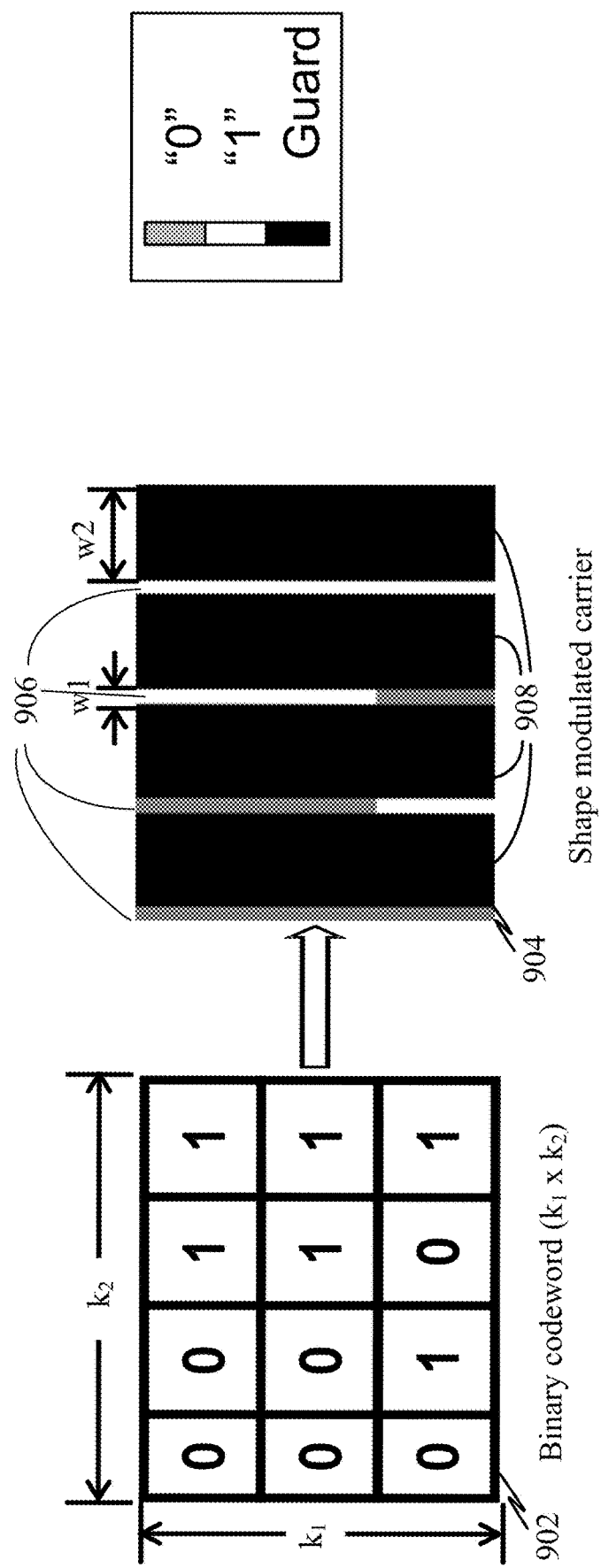
FIG. 9 illustrates how a binary codeword may be represented within a shape modulated carrier.
Figure 10:
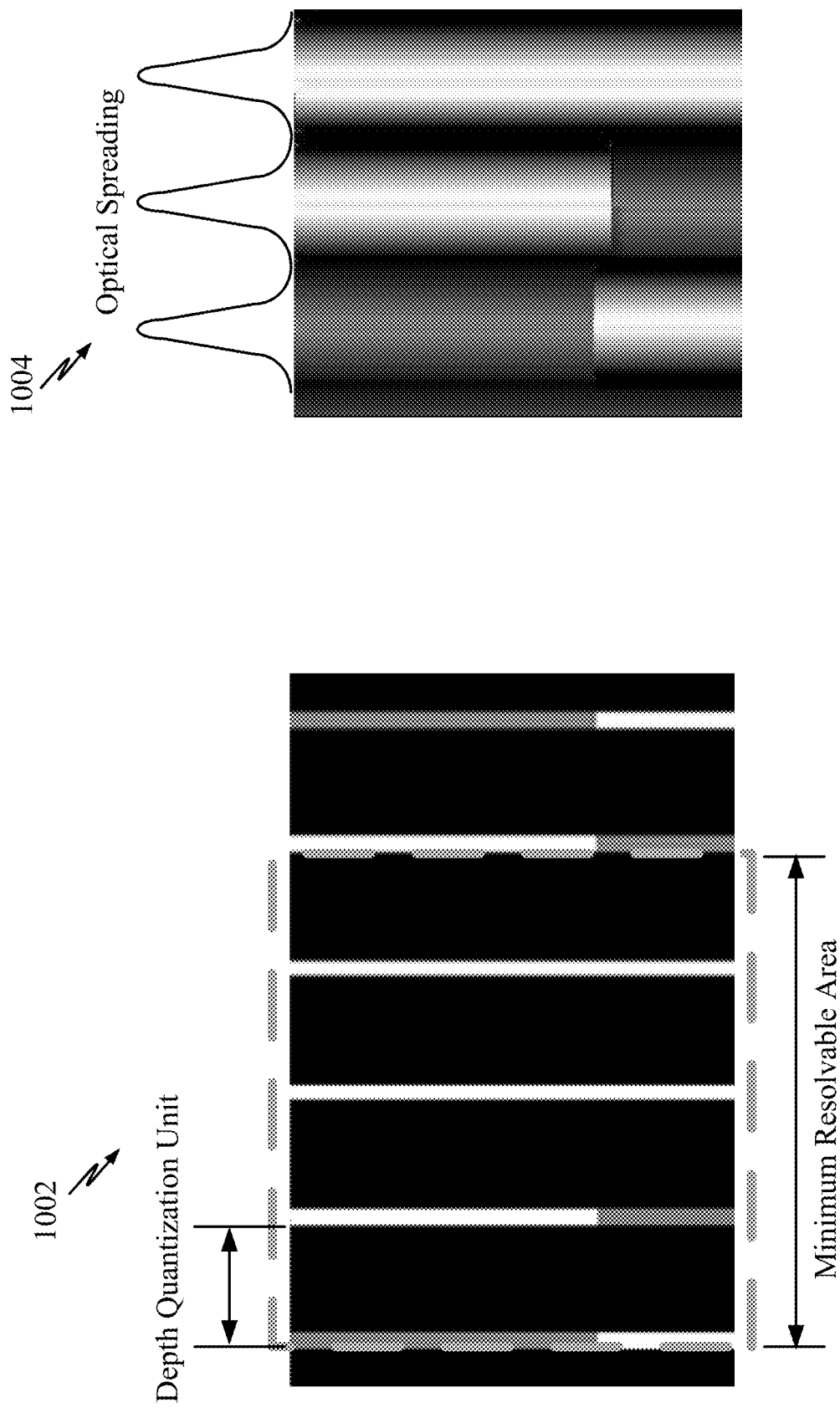
FIG. 10 illustrates further details of the code microstructure using a carrier layer and code layer.

In FIGS. 5, 6, and/or 7, in order to adjust the receiver sensor and/or projecting light source, the captured image(s) is processed to ascertain whether the code mask (and code words therein) are decodable across the captured image. An example of a code mask is illustrated in FIG. 4. FIGS. 9 and 10 further illustrate how code words are defined within code masks.

FIG. 9 illustrates how a binary codeword 902 may be represented within a shape modulated carrier 904. The modulated carrier 904 may include code/reference stripes 906 (e.g., active stripes) and guard intervals 908. The carrier layer 902 may be defined by an active stripe width w1 and a guard interval w2. The active stripe width w1 may be determined by power requirements on the transmitter. The guard interval w2 may be determined by transmitter/receiver Point Spread Function (PSF). Here, a tri-state gray-scale system is used to represent the guard, "0" and "1", where the "0" and "1" levels ratio may be 50%.

FIG. 10 illustrates further details of the code microstructure 1002 using a carrier layer and code layer. In this example, the size of the code mask may be n1×n2, where n1=7 (vertical), n2=585 (horizontal), such that a total of 4095 unique codewords are possible. Smaller codebooks are possible by using a subset of these codewords. Smaller codebooks may be desirable in that it reduces the number of comparisons that must be performed to ascertain whether a codeword match is found. That is, a received/captured code mask may be compared to the codebook used to ascertain each codeword therein. Such comparison may involve matching a region of the received/captured code mask each codeword defined in the codebook to ascertain a match (e.g., or closest match). Consequently, reducing the size of the codebook (e.g., using a small number of codewords) reduces the number of comparisons needed to find a codeword match and reduces the processing resources and/or time to find codeword matches for the received/captured code mask.

The size of a code mask window (e.g., k1×k2 window) used for a codeword may be dependent on the minimum detectable object sought. For example, the code mask window may be a $k_1 \times k_2 = 3 \times 4$ symbol window. Hence, the window size is defined by the minimum detectable object size (e.g., detectable object or feature) and distance at which such object detection occurs. Additionally, depth resolution may be equal to carrier spacing. The guard interval is countermeasure against unknown spreading. The selected parameters may provide a balance between resolution and detection.

Since the code mask projected on a scene to generate a particular image is known, this can be used to obtain a mean square error, Hamming distance, and/or other metrics/parameters that may serve to indicate how to adjust the exposure time and/or light source power.

In some implementations, the careful selection of codewords may also serve to perform error correction of captured code words in an image.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A device adapted to compensate for differences in surface reflectivity in an active depth sensing system, the device comprising:
   a receiver sensor configured to generate a first captured image of a scene that includes:
      a first region of the scene including a first codeword projected by a first light element; and
      a second region of the scene including a second codeword projected by a second light element; and
   a processing circuit configured to:
      ascertain, from the first captured image, a first set of parameters for the first region and a second set of parameters for the second region, the first set of parameters associated with decoding the first codeword and the second set of parameters associated with decoding the second codeword;
      determine, for capture of a subsequent image of the scene, a first light source power of the first light element based on the first set of parameters and a second light source power of the second light element based on the second set of parameters;
cause the receiver sensor to generate a second captured image of the scene using a structured light pattern, the second captured image including a version of the first codeword in the first region of the scene, the version of the first codeword projected by the first light element at the first light source power and a version of the second codeword in the second region of the scene, the version of the second codeword projected by the second light element at the second light source power; and
compare portions of the second captured image to a codebook to decode one or both of the version of the first codeword and the version of the second codeword in the second captured image.

2. The device of claim 1, wherein the first captured image is generated in response to projection by the first light element of the first codeword concurrently with projection by the second light element of the second codeword.

3. The device of claim 1, wherein:
the processing circuit is further adapted to maintain the first light source power to provide a particular illumination while an exposure time of the receiver sensor is adjusted, or to maintain an exposure time of the receiver sensor at a fixed value while the first light source power is adjusted,
the first codeword in the first region is projected primarily by the first light element, and
the second codeword in the second region is projected primarily by the second light element.

4. The device of claim 1, further comprising a projection light source configured to, prior to generation of the first captured image, activate the first light element and the second light element, using a uniform light source power, to project the first codeword and the second codeword onto the scene.

5. The device of claim 4, wherein a value of the uniform light source power is different than a value of the first light source power, the second light source power, or both.

6. The device of claim 1, wherein the processing circuit is adapted to individually control the first light source power and the second light source power.

7. The device of claim 1, wherein the receiver sensor includes a plurality of individually controlled sensor shutters, wherein each shutter corresponds to a region of the first captured image, and wherein the processing circuit is further adapted to individually control the plurality of individually controlled sensor shutters to adjust light captured by the receiver sensor.

8. The device of claim 7, wherein one or more sensor shutters of the plurality of individually controlled sensor shutters are controlled to either reduce or increase the light that passes through the one or more sensor shutters to compensate for too much or too little light in a given region.

9. The device of claim 1, further comprising a projection light source that includes the first light element and the second light element, wherein:
the first codeword is projected to a greater extent by the first light element than by any other light element of the projection light source, and
the second codeword is projected to a greater extent by the second light element than by any other projection light source element.

10. The device of claim 1, wherein the first light element comprises a single light emitting diode, and wherein the first light source power is a non-zero value.

11. The device of claim 1, wherein the structured light pattern comprises a three state structured light pattern.

12. The device of claim 11, wherein the three state structured light pattern includes a first state corresponding to a binary value of 0, a second state corresponding to a binary value of 1, and a third state corresponding to a guard interval.

13. The device of claim 1, wherein the first light element and the second light element provide parallelized light beams.

14. The device of claim 1, wherein the structured light pattern is projected on the scene via a code mask in an infrared spectrum.

15. The device of claim 1, claim 14, further comprising a second receiver sensor to capture an image of the scene without the code mask.

16. The device of claim 1, wherein each of the first codeword and the second codeword is included in a spatial code portion of a plurality of spatial code portions of the structured light pattern, and wherein each spatial code portion of the plurality of spatial code portions includes one or more code stripes and one or more guard intervals.

17. The device of claim 1, wherein the structured light pattern comprises a grayscale structured light pattern.

18. A method to compensate for differences in surface reflectivity in an active depth sensing system, the method comprising:
generating, at a receiver sensor, a first captured image of a scene that includes:
a first region including a first codeword projected by a first light element; and
a second region including a second codeword projected by a second light element;
ascertaining, at a processing circuit from the first captured image, a first set of parameters for the first region and a second set of parameters for the second region, the first set of parameters associated with decoding the first codeword and the second set of parameters associated with decoding the second codeword:
determining, at the processing circuit for capture of a subsequent image of the scene, a first light source power of the first light element based on the first set of parameters and a second light source power of the second light element based on the second set of parameters
causing the receiver sensor to generate a second captured image of the scene using a structured light pattern, the second captured image including a version of the first codeword in the first region of the scene, the version of the first codeword projected by the first light element at the first light source power and a version of the second codeword in the second region of the scene, the version of the second codeword projected by the second light element at the second light source power; and
comparing portions of the second captured image to a codebook to decode one or both of the version of the first codeword and the version of the second codeword in the second captured image.

19. The method of claim 18, further comprising maintaining the first light source power at a particular illumination while an exposure time of the receiver sensor is adjusted.

20. The method of claim 18, further comprising maintaining an exposure time of the receiver sensor at a fixed value while the first light source power is adjusted.

21. The method of claim 18, wherein the first light element and the second light element use a uniform light source power to generate the first captured image.

22. The method of claim 18, wherein the first set of parameters are different from the second set of parameters.

23. The method of claim 22, further comprising capturing the first captured image and the second captured image, wherein the second captured image is light compensated on a region-by-region basis.

24. The method of claim 18, further comprising:
individually controlling a plurality of sensor shutters to modify an amount of light that passes through the plurality of sensor shutters to compensate for a particular amount of light in a given region; and
after controlling the plurality of sensor shutters, capturing the second captured image, wherein the second captured image is light compensated on a region-by-region basis.

25. The method of claim 18, further comprising:
tagging one or more portions of the scene in the first captured image; and
in response to tagging the one or more portions of the scene, determining one or more differences between received codewords included in a reflected structured light pattern of the first captured image and transmitted codewords of both of the first codeword and the second codeword included in a projected structured light pattern to ascertain depth information of the scene in the first captured image.

26. The method of claim 18, wherein the first set of parameters comprises pixel saturation, undecodable pixels, pixel illumination mean, pixel illumination variance, pixel illumination entropy, or any combination thereof.

27. The method of claim 26, further comprising:
estimating a particular adjustment of the first light source power based on one or more parameters of the first set of parameters; and
repeatedly adjusting the first light source power until the one or more parameters reach a threshold.

28. The method of claim 18, wherein the first captured image includes a reflected structured light pattern that includes a plurality of codewords in regions, the plurality of codewords including the first codeword and the second codeword, and wherein the first captured image is captured while receiving ambient light or reflected ambient light.

29. The method of claim 28, wherein each region of the first captured image includes a codeword.

30. The method of claim 18, wherein the first set of parameters include a number of saturated pixels within the first region, and wherein the first light source power of the first light element is determined based on the number of saturated pixels within the first region exceeding a threshold.

31. A device adapted to compensate for differences in surface reflectivity in an active depth sensing system, the device comprising:
means for generating a first captured image of a scene that includes:
a first region including a first codeword projected by a first light element; and
a second region including a second codeword projected by a second light element;
means for ascertaining, from the first captured image, a first set of parameters for the first region and a second set of parameters for the second region, the first set of parameters associated with decoding the first codeword and the second set of parameters associated with decoding the second codeword;
means for controlling a light source power of each of the first light element and the second light element for capture of a subsequent image of the scene, the means for controlling configured to perform a first determination of a first light source power of the first light element based on the first set of parameters and perform a second determination of a second light source power of the second light element based on the second set of parameters;
means for causing the means for generating to generate a second captured image of the scene using a structured light pattern, the second captured image including a version of the first codeword in the first region of the scene, the version of the first codeword projected by the first light element at the first light source power and a version of the second codeword in the second region of the scene, the version of the second codeword projected by the second light element at the second light source power; and
means for comparing portions of the second captured image to a codebook to decode one or both of the version of the first codeword and the version of the second codeword in the second captured image.

32. The device of claim 31, wherein the first light element and the second light element project the first codeword and the second codeword, respectively, using a uniform light source power.

33. The device of claim 31, wherein the first captured image includes additional regions, and wherein the means for ascertaining determines an additional set of parameters for each additional region of the additional regions.

34. The device of claim 31, further comprising means for individually controlling a light source power of the first light element based on the first set of parameters and the second light element based on the second set of parameters.

35. The device of claim 34, wherein the second captured image is light compensated on a region-by-region basis.

36. The device of claim 31, further comprising:
means for individually controlling a plurality of sensor shutters based on the first set of parameters to adjust light captured by the means for generating.

37. A non-transitory processor-readable storage medium having one or more instructions to compensate for differences in surface reflectivity in an active depth sensing system, the one or more instructions when executed by one or more processors causing the one or more processors to:
generate, at a receiver sensor, a first captured image of a scene that includes:
a first region including a first codeword projected by a first light element; and
a second region including a second codeword projected by a second light element;
ascertain, the first captured image, a first set of parameters for the first region and a second set of parameters for the second region, the first set of parameters associated with decoding the first codeword and the second set of parameters associated with decoding the second codeword;
determine, for capture of a subsequent image of the scene, a first light source power of the first light element based on the first set of parameters and a second light source power of the second light element based on the second set of parameters;
cause the receiver sensor to generate a second captured image of the scene using a structured light pattern, the second captured image including a version of the first codeword in the first region of the scene, the version of the first codeword projected by the first light element at the first light source power and a version of the second codeword in the second region of the scene, the version of the second codeword projected by the second light element at the second light source power; and compare portions of the second captured image to a codebook to decode one or both of the version of the first codeword and the version of the second codeword in the second captured image.

38. The non-transitory processor-readable storage medium of claim 37, wherein the one or more instructions when executed by the one or more processors further causes the one or more processors to maintain the first light source power to provide a particular illumination while an exposure time of the receiver sensor is adjusted.

39. The non-transitory processor-readable storage medium of claim 37, wherein the one or more instructions when executed by the one or more processors further causes the one or more processors to maintain an exposure time of the receiver sensor at a fixed value while the first light source power is adjusted.

40. The non-transitory processor-readable storage medium of claim 37, wherein execution of the one or more instructions further causes the one or more processors to capture the first captured image and the second captured image, and wherein the second captured image is light compensated on a region-by-region basis.

\* \* \* \* \*